United States Patent [19]

Wade, Jr. et al.

[11] Patent Number: 4,761,520
[45] Date of Patent: Aug. 2, 1988

[54] SPIRAL WRAPPED INSULATED MAGNET WIRE

[75] Inventors: Ivan W. Wade, Jr., Fort Wayne, Ind.; John D. Hessler, Payne, Ohio

[73] Assignee: United Technologies Corporation, Hartford, Conn.

[21] Appl. No.: 63,202

[22] Filed: Jun. 17, 1987

[51] Int. Cl.$^4$ .................. H01B 7/02; H01B 13/08; H05K 13/00

[52] U.S. Cl. .................. 174/121 R; 29/854; 156/53; 156/56; 174/121 SR; 174/122 R; 174/122 G

[58] Field of Search ......... 174/121 R, 121 SR, 122 R, 174/122 G, 122 C, 110 R, 110 PM; 29/854; 156/53, 56; 428/383, 377, 395

[56] References Cited

U.S. PATENT DOCUMENTS

| | | | |
|---|---|---|---|
| 2,234,560 | 3/1941 | Keyes | 174/121 R |
| 2,349,952 | 5/1944 | Fuller | 174/121 SR |
| 2,390,039 | 11/1945 | Slayter et al. | 174/122 G |
| 2,691,694 | 10/1954 | Young | 174/121 R |
| 2,734,934 | 2/1956 | McKnight | 174/121 R |
| 3,019,285 | 1/1962 | De Lutis | 174/121 R |
| 3,222,149 | 12/1965 | Drummond | 174/110 PM |
| 3,325,590 | 6/1967 | Westervelt et al. | 174/121 R |
| 3,867,758 | 2/1975 | Johnson | 174/122 G X |
| 3,893,642 | 7/1975 | Van Vlaenderen | 174/110 PM X |
| 4,045,611 | 8/1977 | Torgerson | 174/121 SR |
| 4,131,714 | 12/1978 | Karkoski et al. | 174/110 PM X |

FOREIGN PATENT DOCUMENTS 131791 10/1979 Japan .................. 174/121 R

Primary Examiner—Morris H. Nimmo
Attorney, Agent, or Firm—Harry J. Gwinnell

[57] ABSTRACT

Magnet wire substrates (1) are described having a layer of glass fiber (2) wrapped thereon, which has a layer of spirally wrapped and bonded polyester insulation tape (3) as the outermost layer. The resulting insulated magnet wire in addition to having the requisite electrical properties has improved physical properties including increased flexibility and ease of strippability.

3 Claims, 1 Drawing Sheet

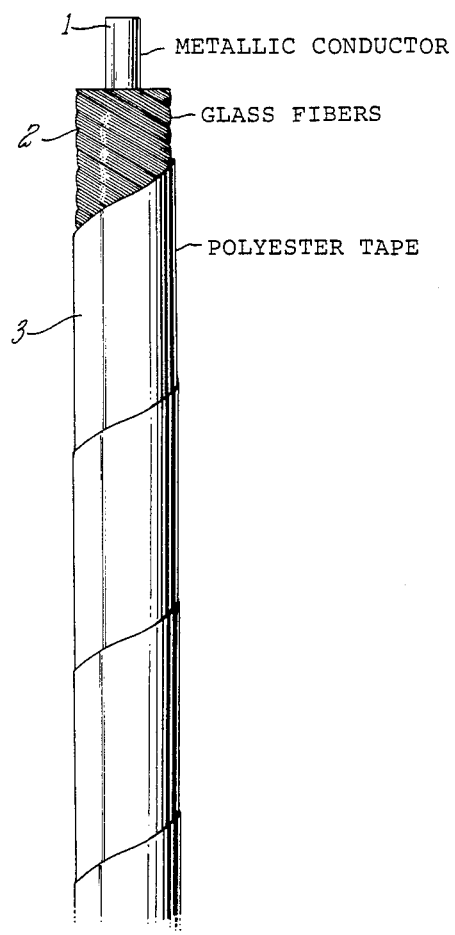

SPIRAL WRAPPED INSULATED MAGNET WIRE

DESCRIPTION

TECHNICAL FIELD

The field of art to which this invention pertains is insulated electrical conductors, and specifically insulated magnet wire.

BACKGROUND ART

Insulated magnet wires are primarily used to form coils that create magnetic fields within electrical devices. The majority of these magnet wires have electrical insulation which is bonded to the conductor. This bonded insulation provides toughness to the coated wire but does present other problems.

In use it is necessary to strip the insulation from the wire, for example to connect the wire to the source of electrical energy or to additional electrical components. The added costs and labor to remove this material is tolerated by users because of the desirable toughness imparted to the wires by the bonded coating.

Accordingly, what is needed in this art, is an insulated conductor which provides the required electrical and physical properties, but is readily removable in use.

DISCLOSURE OF INVENTION

An electrically insulated magnet wire substrate is disclosed comprising a metallic conductor with a non-bonded layer of electrical grade glass fiber wound thereon. On top of the glass fiber layer is spirally wrapped multilayered polyester insulation tape. The resulting insulated magnet wire, in addition to having excellent physical and electrical properties, has superior flexibility properties and is easily removable.

Another aspect of the invention is a method of making the electrically insulated magnet wire substrates by overwrapping the metallic conductor with the electrical grade glass fiber. The fiber is wound around the electrical conductor circumferentially with adjacent strands abutting. Over the glass fiber layer is spirally wrapped the multilayered polyester insulation tape. One side (inner surface) of the tape contains a layer of polyester in amorphous form and the other side (outer surface) of the tape contains a layer of polyester in crystalline form. The tape is wrapped in overlapping fashion. After such wrapping the wire is heated to melt the polyester material also causing the amorphous layer to become crystalline.

Another aspect of the invention is an improved method for connecting wires from the source of electrical energy to an electrical component, or connecting electrical components together, by stripping insulation from a portion of the wire to make the connection followed by making the connection through mechnical or solder means. By utilizing the wire described above the stripping process is greatly reduced in time, expense, and energy.

The foregoing and other features and advantages of the present invention will become more apparent from the following description and accompanying drawing.

BRIEF DESCRIPTION OF DRAWING

The FIGURE demonstrates a spirally wrapped wire according to the present invention.

BEST MODE FOR CARRYING OUT THE INVENTION

The electrical conductors (1) to be insulated with the tape are conventional conductors in this art and can be either circular, square, or rectangular in cross section, or even hollow (for example for use in waveguides). In addition to solid metal substrates, stranded wires, for example as in cable material, can also be used as the conductor in the present invention.

The wire is generally copper or aluminum and ranges anywhere from 0.020 mil to 460 mils in diameter, with wires 64 mils to 325 mils in diameter being the most commonly treated wires according to the present invention. Typcially for circular cross-section wire 20 gauge (American Wire Gauge) to 1/0 gauge are used, for square cross-section wire 14 gauge to 1/0 gauge, and for retangular cross-section wire, wires 25 to 325 mils thick by 50 mils to 700 mils wide are used. And while the wires are typically bare, i.e. no prior applied insulation material, wires with conventional insulation polymeric coatings (e.g. polyester, polyamide, polyamideimide, etc.—see commonly assigned U.S. Pat. Nos. 4,290,929; 4,374,221; 4,471,022; and 4,476,279, the disclosures of which are incorporated by reference) already applied can also be used according to the present invention.

The type of glass fiber (2), including the spacing and diameter of the fiber, will depend on the particular substrate being wrapped and the particular insulation properties desired. For example, for rectangular and square conductors the fiber diameter is chosen to optimally cover the corners and the spacing is chosen so as to evenly distribute the glass fibers uniformly across the width and thickness of the shaped wires. For circular cross-section wires, the even distribution of the fibers is key. The fibers are actually yarns ranging from 225 denier to 900 denier having an end count typically 8 ends to 36 ends, although any combination can be selected depending on the properties desired and the substrate being wrapped. Typical glass fibers include Owens Corning Corporation electrical grade 275, 450 and 900 denier glass fiber. Glass fibers in tape form, woven or non-woven, can also be used. Other high strength, high temperature stable fibers (such as Kevlar ® fibers available from E. I. DuPont deNemours and Company, Inc.) can also be used.

The glass fiber is spirally or helically wrapped onto the electrical conductor as a single layer with adjacent fibers touching (butt lapped). This is typically done using conventional glass wrapping machines such as U.S. Machinery taping machines.

After applying the glass fiber to the substrate, the glass fiber is then overwrapped with the multilayer polyester tape material (3). The polyester can be any electrical grade polyester with one special requirement. The polyester must be multilayer and have an inner surface to go against the glass fiber which is in amorphous form and an outer surface representing the outer surface of the wire insulation which is in crystalline form. Such material is available from Sterling Paper Company (Seymour, Conn.) as their designation number 809 or 809M. Typically this tape is a polyethylene terephthalate 0.0006 inch to 0.0005 inch thick (with 1.2 mil preferred) and 0.25 inch to 1.0 inch wide (with 0.75 inch preferred). The tape may be wrapped on the glass fiber by abutting the respective edges or with a degree of overlap. Typically overlapping of 10% to 75% based on the lower layer is performed, with an approximately 50% overlap preferred. Conventional dual head taping machines such as are available from U.S. Machinery Company may be used for the wrapping operation. Magnaply TM tape packing can also be used. While the polyester tape can be wrapped in the same direction as the glass fiber material, typically the polyester tape is wrapped in a direction opposite that of the glass fiber. This cross laying provides better physical properties than laying in the same direction. The amorphous portion of the multilayer tape typically represents 10% to 50% of the overall thickness of the tape and more typically 20% to 40%.

After applying the polyester layer, the wrapped wire is heated in any conventional heating equipment which can provide fast, controllable heating, such as radiant or air heaters or induction heaters manufactured by Lepel Corporation (New York), or Robotron (Michigan). The heating is controlled so as to affect proper fusing of the polyester to the glass, causing the amorphous layer to become crystalline, while preventing degradation of the film and minimal shrinkage. Typically, for example, for the Sterling type tapes described above, the temperatures of the coated wire reaches 220° F. to 400° F., and preferably 280° F. to 320° F., for a fraction of a second up to about 1.5 minutes.

Although the relative amounts of polyester and glass vary with the intended use of the insulated conductor, the wires typically contain about 10% to about 90%, and preferably about 60% to about 80%, by weight glass fiber based on weight of fiber plus polyester.

EXAMPLE

A 5.5 gauge (American Wire Gauge) round copper wire was wrapped using U.S. Machinery Company serving equipment with 450 denier electrical grade glass fiber purchased from Owens Corning. The diameter of the conductor increased by 4 mils after wrapping with the glass fiber. This same U.S. Machinery Company taping equipment was used to apply multilayer polyester film purchased from Sterling Paper Company under the designation 809M in a direction opposite that used to wrap the glass fiber. The polyester film was 1.2 mils thick and was overlapped 50%. The thus wrapped wire was passed through an induction heater to fuse the material and provide a smooth coating. The induction heater raised the temperature of the copper wire to 300° F. for up to 1.33 seconds. This was sufficient to fuse the tape to the glass without drying out or shrinking the tape material. The resulting material had a smooth, slippery coat, which was easily removable.

In addition to the easy removability (for example, using a conventional cutting tool to cut the tape and glass and removing with the fingers) of the insulation of the magnet wire according to the present invention, the wire has excellent physical properties such as toughness, (winding machine toughness), abrasion resistance, a low coefficient of friction (lubricity), etc. In addition it has good electrical properties such as high dielectric strength and high corona resistance. It compares favorably with Dacron TM -glass insulation in electrical properties with improved physical properties.

Such wire has utility, for example, in motors in general, in transformer windings, in field armatures for motors, coils in general, generators in general, open motors, etc. The wire is particularly able to withstand winding abuse insertion into motors, and has thermal stability and increased flexibility (tighter radius bending without rupture).

Although the invention has been shown and described with respect to detailed embodiments thereof, it will be understood by those skilled in the art that various changes in form and detail thereof may be made without departing from the spirit and scope of the invention.

We claim:

1. An electrically insulated magnet wire comprising a multilayered polyester insulation tape spirally wrapped and bonded to a layer of glass fibers wound on but unbonded to a metallic conductor, the resulting insulated magnet wire having high physical and electrical insulation properties, increased flexibility, and ease of strippability.

2. A method of making an electrically insulated magnet wire comprising:

circumferentially winding a layer of electrical grade glass fiber on top of a metallic conductor, each individual winding abutting the previous individual winding, wrapping in spiral abutting or overlap fashion on top of the glass fiber layer at least one layer of a multilayered polyester insulation tape, said multilayered polyester insulation tape comprising an amorphous layer and a crystalline layer bonded thereto, the multilayered polyester insulation tape being spirally wrapped on the glass fiber layer such that the amorphous layer contacts the glass fiber, subjecting the thus wrapped metallic conductor to sufficient heat to fuse the polyester tape to the glass fiber layer, resulting in a tape having high physical and electrical insulating properties, increased flexibility, and ease of stripability.

3. A method of connecting an insulated electrical conductor between a source of electrical energy and an electrical component or between electrical components comprising stripping insulation from the ends of an insulated electrical conductor and connecting the ends of the conductor between a source of electrical energy and an electrical component or between electrical components by mechanical or solder means, wherein the improvement comprises utilizing as the insulated electrical conductor a multilayered polyester insulation tape spirally wrapped on a layer of glass fibers wound on but not bonded to an electrical conductor.

* * * * *

UNITED STATES PATENT AND TRADEMARK OFFICE
CERTIFICATE OF CORRECTION

PATENT NO. : 4,761,520
DATED : August 2, 1988
INVENTOR(S) : Ivan W. Wade, Jr., et al.

It is certified that error appears in the above-identified patent and that said Letters Patent is hereby corrected as shown below:

Column 3, line 40, delete "purchased from" and insert - - provided by - -.

Signed and Sealed this

Twenty-fourth Day of October, 1989

Attest:

DONALD J. QUIGG

*Attesting Officer*　　　　　*Commissioner of Patents and Trademarks*